United States Patent [19]

Lucy

[11] Patent Number: 5,427,493
[45] Date of Patent: Jun. 27, 1995

[54] HAND TRUCK WITH HORIZONTALLY SPREADABLE ARMS

[76] Inventor: Patrick Lucy, P.O. Box 4090, Cave Creek, Ariz. 85331

[21] Appl. No.: 162,636

[22] Filed: Dec. 3, 1993

[51] Int. Cl.6 .............................................. B62B 1/06
[52] U.S. Cl. ................................................... 414/451
[58] Field of Search ........................... 414/449–452, 414/490, 458; 280/47.29

[56] References Cited

U.S. PATENT DOCUMENTS

| | | | |
|---|---|---|---|
| 979,053 | 12/1910 | Archibald | 414/452 |
| 990,187 | 4/1911 | Bergsather | 414/452 |
| 1,083,982 | 1/1914 | Blessing | 414/451 |
| 1,165,507 | 12/1915 | Hovde | 414/452 |
| 1,397,719 | 11/1921 | Bryan | 414/452 |
| 1,502,057 | 7/1924 | Piper | 414/451 |
| 1,551,928 | 9/1925 | Bryan | 414/452 |
| 1,801,971 | 4/1931 | Norling | 414/451 |
| 1,971,952 | 8/1934 | Townsend | 414/451 |
| 2,109,305 | 2/1938 | Stine | 414/451 |
| 2,292,605 | 8/1942 | Brase | 414/451 |
| 2,312,461 | 3/1943 | Woods | 414/451 |
| 2,316,614 | 4/1943 | Pierce | 414/451 |
| 2,328,224 | 8/1943 | Moorehead | 414/451 |
| 2,367,752 | 1/1945 | Broome | 414/451 |
| 2,475,874 | 7/1949 | Bartlett | 414/452 |
| 2,485,545 | 10/1949 | Bishop | 414/452 |
| 2,500,047 | 3/1950 | Smith | 414/451 |
| 2,592,644 | 4/1952 | Bartlett | 414/451 |
| 2,794,564 | 6/1957 | Frieburger | 414/451 |
| 3,084,820 | 4/1963 | Malo | 414/450 X |
| 3,425,575 | 2/1969 | Crawford | 414/452 |
| 3,499,658 | 3/1970 | Fernholz et al. | 414/450 X |

Primary Examiner—David A. Bucci
Attorney, Agent, or Firm—Christopher A. Klein

[57] ABSTRACT

A manually operable two-wheeled hand truck is provided, and in particular a hand truck with a pair of gripping extensions capable of spreading horizontally to a desired distance apart without rotation of the gripping extensions about a pivot point.

8 Claims, 3 Drawing Sheets

HAND TRUCK WITH HORIZONTALLY SPREADABLE ARMS

BACKGROUND OF THE INVENTION

1. Field of the Invention

The present invention relates to manually operable two-wheeled hand trucks and in particular to a hand truck which is provided with a pair of curved gripping extensions for engaging, said gripping extensions attached to a means for spreading said gripping extensions horizontally to a desired distance apart without rotation of the gripping extensions about a pivot. The gripping extensions may be spread to a desired distance apart by a hand crank located on a side of the truck frame.

2. Description of the Prior Art

The handling and moving of stacked tires in a warehouse setting is a tedious and cumbersome task using commonly available two-wheeled hand trucks. The prior art hand trucks most commonly in use are those having a stationary mounted gripping extension(s) which is/are adapted to be slid under the object or objects to be transported. The object or stack of objects must be tilted away from the hand truck in order for the gripping extension to be positioned between the bottom of the object or objects and the floor. Thus, two people are often required to load the objects onto the truck.

When moving a stack of tires, however, prior art hand trucks with a single stationary mounted gripping extension or toe are impractical for several reasons. First, the prior art trucks with a single stationary toe only provide a nominal support surface. Specifically, they do not readily permit the adjusting of the alignment of the tires, nor do they provide a sufficient grasping force toward the front of the tires to give a lifting force to the entire stack to prevent buckling or collapsing of the stack of tires. Additionally, since most car and truck tires range in size from roughly 20 to 34 inches in diameter, it is difficult for one size hand truck to accommodate all sizes and still provide a means to move each size stack of tires in an orderly fashion. Examples of such prior art hand trucks with a single stationary gripping extension can be found in U.S. Pat. Nos. 1,201,957; 3,642,301; 4,114,771; and 4,226,434 herein incorporated by reference.

Hand trucks having load engaging jaws which swing around vertical axes and in a horizontal plane during loading are known. Examples of this type of truck can be found in U.S. Pat. Nos. 1,551,928; 2,475,874; 2,485,545; and 3,084,820 incorporated herein by reference. However, a distinct disadvantage of using this type of hand truck is that the object or stacks of objects, for example stacks of tires, must be stacked some distance apart to give enough space on either side for the gripping extensions to swing horizontally and engage the object or objects. Additionally, the force used to move the gripping extensions in the horizontal position is exerted via a foot pedal connected to the gripping extensions by a series of rods and links, which tends to cause stiff and jerky movement of the gripping extensions, and with continued use, weakening of the connecting rods and links. Further, these prior art trucks fail to provide a means whereby the gripping extensions are prevented from further movement after the load is lifted, and the gripping extensions often shift causing the stack of tires to fall from the hand truck.

Another variation of this type of hand truck is found in U.S. Pat. No. 3,425,575 which discloses a truck wherein a pair of gripping extensions swing around horizontal axes and toward and away from each other along a vertically disposed arcuate path with respect to the floor surface. However, this type of hand truck also suffers from the disadvantages noted above.

Accordingly, it is an object of the present invention to provide a hand truck comprising a frame with a pair of curved gripping extensions attached at the base thereof, said gripping extensions capable of being spread in a horizontal plane without pivoting around vertical axes. The pair of gripping extensions may then be opened to a distance sufficient to insert between stacks of tires, with minimal space between the stacks, and can then be tightened about the stack for moving. The truck of the present invention also provides a means whereby the gripping extensions are prohibited from further movement after a stack of tires is lifted, thereby providing greater stability in transport.

Another object of the present invention is to provide a hand truck with a means for spreading a pair of gripping extensions attached to the frame of said hand truck, said means comprised of a sprocket and link chain mechanism which is turned by a hand crank on a side of the truck frame. This sprocket and link chain mechanism provides a smooth and easy way for said gripping extensions to be adjusted to fit tires of various diameter.

A further object of the present invention is to provide a mechanism for spreading or adjusting the distance between gripping extensions on a hand truck comprised of a threaded drive screw bar in the base of said hand truck, said bar comprised of a left threaded screw on one half and a right threaded screw on the other half, with a floating nut on each left and right threaded half, said nut containing extensions capable of engaging and moving said gripping extensions upon axial rotation of said threaded drive screw bar.

SUMMARY OF THE INVENTION

In accordance with these and other objects of the present invention, a manually operable, two-wheeled truck is disclosed comprised of a frame mounted on a pair of wheels, a hand truck base also attached to said frame, a pair of gripping extensions slidably attached to said hand truck base, said gripping extensions capable of being adjusted laterally along said base, a means for laterally adjusting said gripping extensions located on the hand truck base, and a hand crank located on a side of the hand truck frame connected to said means for horizontally moving said gripping extensions by a sprocket and link chain.

This invention provides a hand truck with a pair of gripping extensions (e.g., arms, tongs, clamps, etc.) that are easily and smoothly horizontally adjustable, a hand truck that can be slid between stacks of tires with minimal distance between the stacks, and that is therefore the ideal truck to use in moving stacks of tires around an area. Additionally, the means for laterally adjusting said gripping extensions permits greater amounts of energy to be transported to the gripping extensions than previously available.

When the bottom tire of a stack of tires is gripped by the gripping extensions and the hand truck is tilted back to transport the load, the pressure exerted on the gripping extensions by the weight of the stack prevents any further lateral movement of the gripping extensions and keeps them in place. This mechanism of preventing lateral movement of the gripping extensions is much more effective than the "locks" found in the prior art hand trucks.

DETAILED DESCRIPTION OF THE INVENTION

Figure 1:
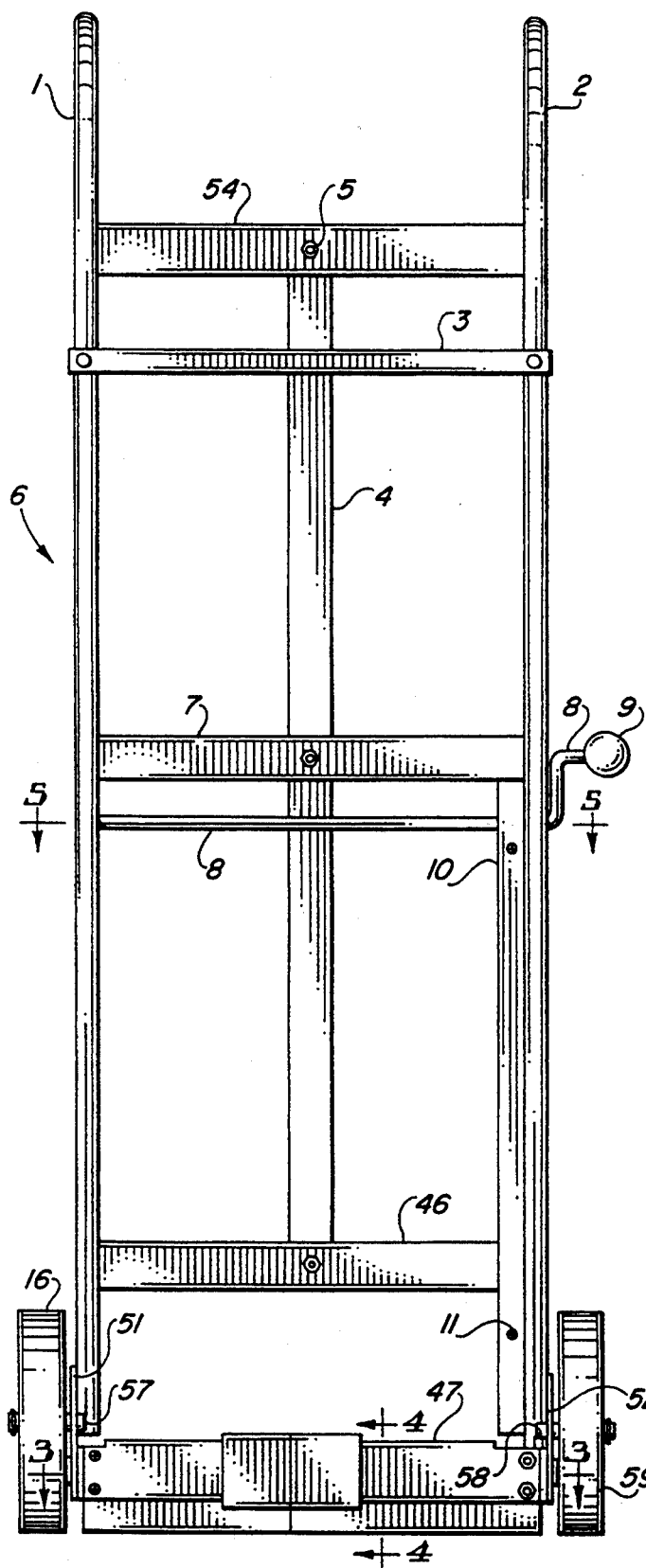
FIG. 1 is a rear view of an embodiment of a hand truck of the present invention.

In a preferred embodiment of the present invention, hand truck frame 6 is comprised of left rail 1 and right rail 2, each rail having a front and back portion joined at the top by a continuous loop. Lateral support 3 is attached to left rail 1 and right rail 2 toward the top of the rails on the rear portions, by a means for attaching. Stack balancing supports 54, 7 and 46 are attached to the front portion of rails 1 and 2, with one placed toward the top of the truck rails, one in the center of the truck rails and the third toward the bottom of the truck rails. Said stack balancing supports may be straight or curved or bent in such a way to accommodate the circular shape of the object or objects being moved, and are attached via a means for attaching. Center support bar 4 is attached to the back and center of, and extends between, stack balancing supports 54, 7 and 46 via a means for attaching. Said means for attaching may be comprised of any means commonly available such as, but not limited to, a weld, screw, nut and bolt, or glue.

Figure 2:
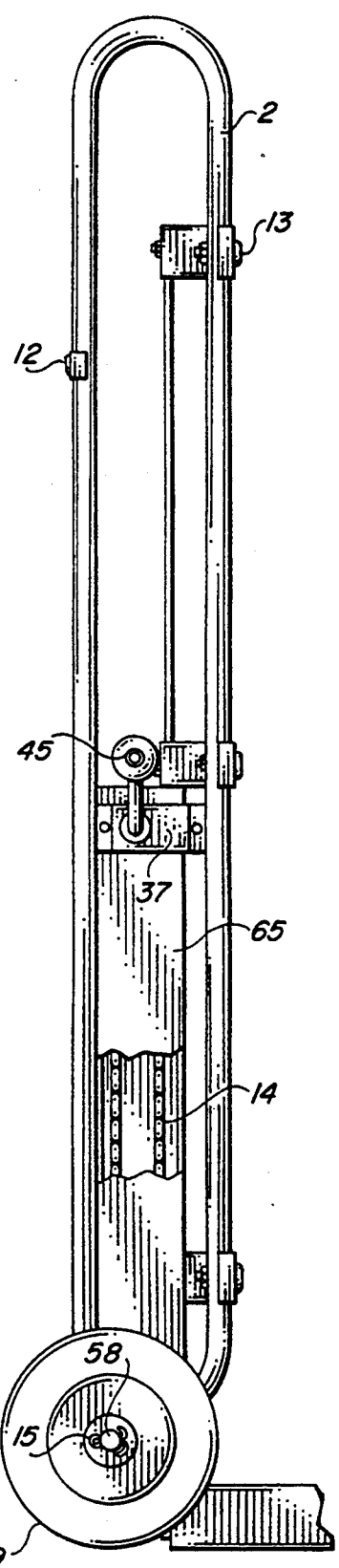
FIG. 2 is a side view of an embodiment of a hand truck of the present invention, with an exploded view showing the link or roller chain used to transmit the force from the crank and top sprocket to the lower sprocket to turn the means for horizontally spreading a pair of gripping extensions.

Left rail 1 is attached at the bottom to base plate 51, and right rail 2 is attached at the bottom to base plate 52, via a means for attaching. Axle 57 is attached to base plate 51, and extends perpendicularly outwardly to accept wheel 16, and contains a hole toward the extended end. Wheel 16 is attached to axle 57, and secured in place by a cotter pin inserted through the hole in the extended end of axle 57. Axle 58 is attached to base plate 52, and extends perpendicularly outwardly to accept wheel 59, and contains a hole toward the extended end. Wheel 59 is attached to axle 58, and secured in place by a cotter pin (shown as 15 in FIG. 2) inserted through the hole in the extended end of axle 58.

Hand truck base 47 is attached to base plates 51 and 52 via a means for attaching, and houses a means for laterally adjusting. Hand truck base 47 is comprised of a rear side 26, a top side 60, and a front side 50, to form a housing within which is contained a means for laterally adjusting the distance between left gripping extension 48 and right gripping extension 49. Rear side 26, top side 60 and front side 50 may be comprised of three separate sections joined by a means for attaching, or may be comprised of one slab or sheet of metal bent into the desired housing shape.

Said means for laterally adjusting housed in hand truck base 47 is comprised of left threaded left drive screw bar 20 (FIG. 3), one end of which is attached to base plate 51 by a means for attaching and a means for permitting axial rotation (e.g., bearings). The other end of drive screw bar 20 is coupled to one end of right threaded right drive screw bar 25 via a means for coupling. The other end of right threaded drive screw bar 25 is attached to sprocket 27, said sprocket 27 being attached to base plate 52 via a means for attaching and a means for permitting axial rotation (e.g., bearings).

Figure 7A:
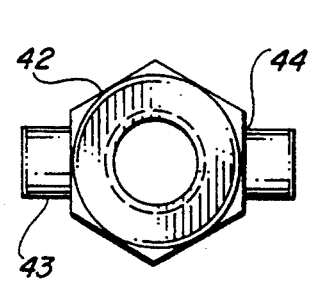
FIG. 7 shows the screw nut and screw nut extensions used to connect the gripping extension connection sleeves to the means for spreading the gripping extensions.
Figure 7B:
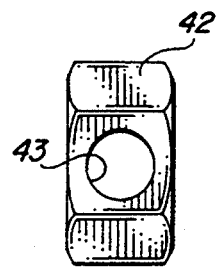

Left threaded left drive screw bar 20 and right threaded right drive screw bar 25 are both threaded with a screw nut 42, each of said screw nuts 42 comprised of an interior threaded portion and and exterior gripping portion. Screw nut 42 (FIG. 7) on left threaded drive screw bar 20, and screw nut 42 on right threaded drive screw bar 25, both contain at least two screw nut extensions 43 located on opposite sides of the exterior gripping portion of screw nuts 42. Screw nut 42 on left threaded drive screw bar 20 is positioned at a distance from coupler 23 equal to the distance between screw nut 42 on right threaded drive screw bar 25 and coupler 23.

Left gripping extension 48 and right gripping extension 49 are attached to hand truck base 47 via two sleeves, each sleeve comprised of a rear side 61, a top side 56, a front side 62, and a bottom side 53. Rear side 61, top side 56 and front side 62 may be comprised of three separate pieces joined together at the seams by a means for joining, or may be formed by a single piece or slab bent or formed into the desired sleeve shape. Bottom side 53 is attached at the seams to rear side 61 and front side 62 via a means for attaching, said means comprised of, but not limited to, a weld, glue or screws. Left gripping extension 48 is attached to the front side 62 of one sleeve, and right gripping extension 49 is attached to the front side 62 of another sleeve by a means for attaching, said means comprised of, but not limited to, a weld, glue or screws. The sleeve connected to left gripping extension 48 and the sleeve connected to right gripping extension 49 are slid over hand truck base 47 (see FIGS. 3 and 4), thereby connecting gripping extensions 48 and 49 to the hand truck assembly.

Figure 4:
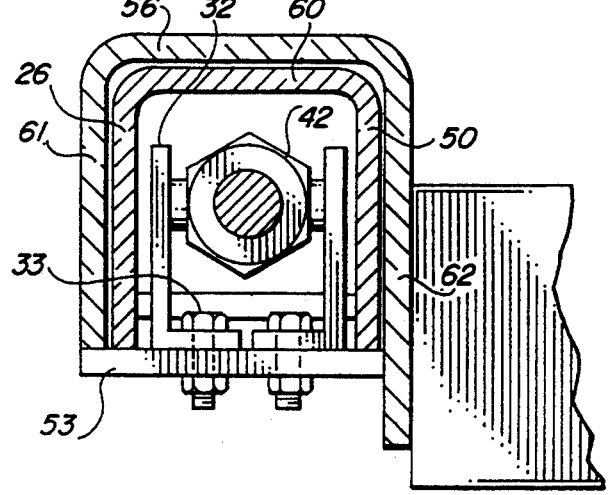
FIG. 4 is a cross sectional view of the hand truck base, showing the hand truck base, gripping extension connection sleeve, and the means for horizontally spreading the gripping extensions.
Figure 6A:
FIG. 6 shows a side, top and back view of the L-brackets used to connect the gripping extension connection sleeves to the means for spreading the gripping extensions.
Figure 6B:
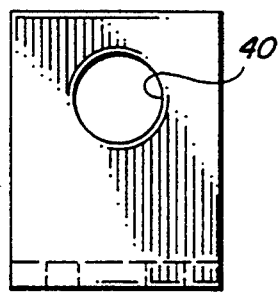
Figure 6C:
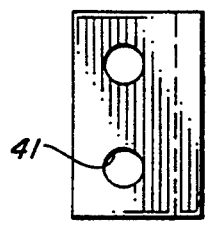

The sleeve attached to left gripping extension 48 and the sleeve connected to right gripping extension 49 each contain two L-brackets 32, said L-brackets attached to bottom side 53 in such a way as to extend upwardly into the housing created by rear side 26, top side 60, and front side 50 of hand truck base 47 (See FIG. 4). Each L-bracket 32 (FIG. 6) contains a single hole 40 through the longer or upright side of the bracket, said hole 40 being slightly larger in diameter than screw nut extensions 43. L-brackets 32 are attached to bottom side 53 via a means for attaching, said means for attaching comprised of, but not limited to, a weld, nut and bolt (33), metal screw or glue.

The sleeve attached to left gripping extension 48 and the sleeve attached to right gripping extension 49 are attached to the means for laterally adjusting by insertion of screw nut extensions 43 into and through hole 40 in each of the L-brackets provided in the sleeves, as depicted in FIG. 4. By this "floating nut" connection, when drive screw bar 25 is rotated, by coupler 23 drive screw bar 20 is also rotated, and screw nut 42 on screw bar 25 and screw nut 42 on screw bar 20 spread apart and force the sleeves to move apart by the connection between the nut extensions 43 and the L-brackets 32, and hence gripping extensions 48 and 49 are laterally adjusted. It is important to the working of this embodiment of the present invention that hole 40 be larger in diameter than screw extensions 43, so as to provide a loose fit and permit smooth movement of "floating" screw nuts 42. A means for controlling the axial rotation of screw bar 20 and screw bar 25 is provided, whereby the rotation can be caused in either direction and thereby cause the screw nuts 42 to spread apart away from coupler 23 or move together toward coupler 23.

Figure 5:
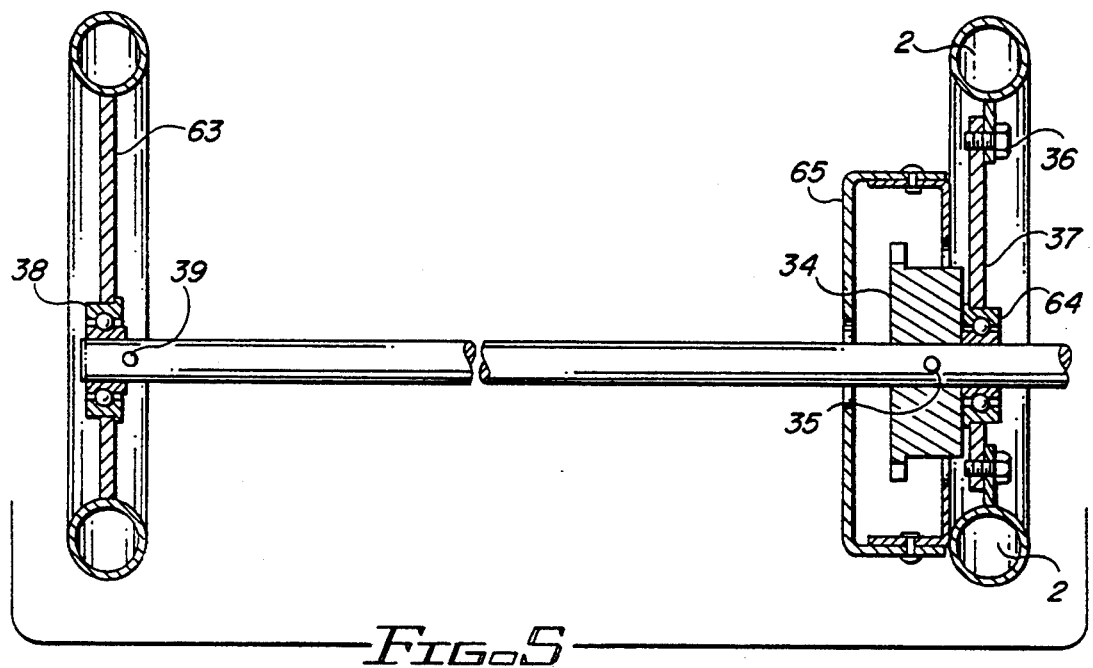
FIG. 5 is a cross sectional view of the crank shaft located on the hand truck frame and used to exert the force to drive the means for horizontally spreading the gripping extensions.

Said means for controlling the rotation of screw bar 25 and screw bar 20 is comprised of crank knob 9, attached to crank shaft 8. Crank shaft 8 is attached to right frame handle 2 by upper right crank support 37, said support 37 being attached to the front and rear portions of frame handle 2 (FIG. 5). Crank shaft 8 extends through upper right crank support 37 via a means for allowing rotation 64 (e.g., bearings), and is attached to an upper sprocket 34 (or alternatively upper sprocket 34 is slid over crank bar 8 and held in place by a pin 35), said upper sprocket 34 located on the right side of hand truck frame 6, and at a position above lower sprocket 27. Crank shaft 8 extends horizontally from the upper right crank support 37 to left frame handle 1, and is attached to upper left crank support 63 via a means for allowing rotation 38 (e.g., bearings). A link or roller chain 14 is provided, said link chain 14 being engaged with upper sprocket 34 and lower sprocket 27. Link chain 14 is housed by and protected by chain housing 65.

By rotating crank knob 9, a hand truck user will cause the axial rotation of sprocket 34 and by transmission of the rotational force to sprocket 27 via link chain 14, will cause the rotation of drive screw bar 20 and drive screw bar 25. When drive screw bar 20 and drive screw bar 25 are rotated, screw nut 42 on left threaded left drive screw bar 20 will move in a direction opposite to that of screw nut 42 on right threaded right drive screw bar 25. As the screw nuts move on their respective screw bars, screw nut extensions 43, which are inserted in holes 40 in L-brackets 32, force the movement of the sleeves attached to gripping extensions 48 and 49. In this way, a user can turn crank knob 9 in one direction to spread gripping extensions 48 and 49 apart, and turn crank knob 9 in the opposite direction to bring gripping extensions 48 and 49 together.

Figure 3:
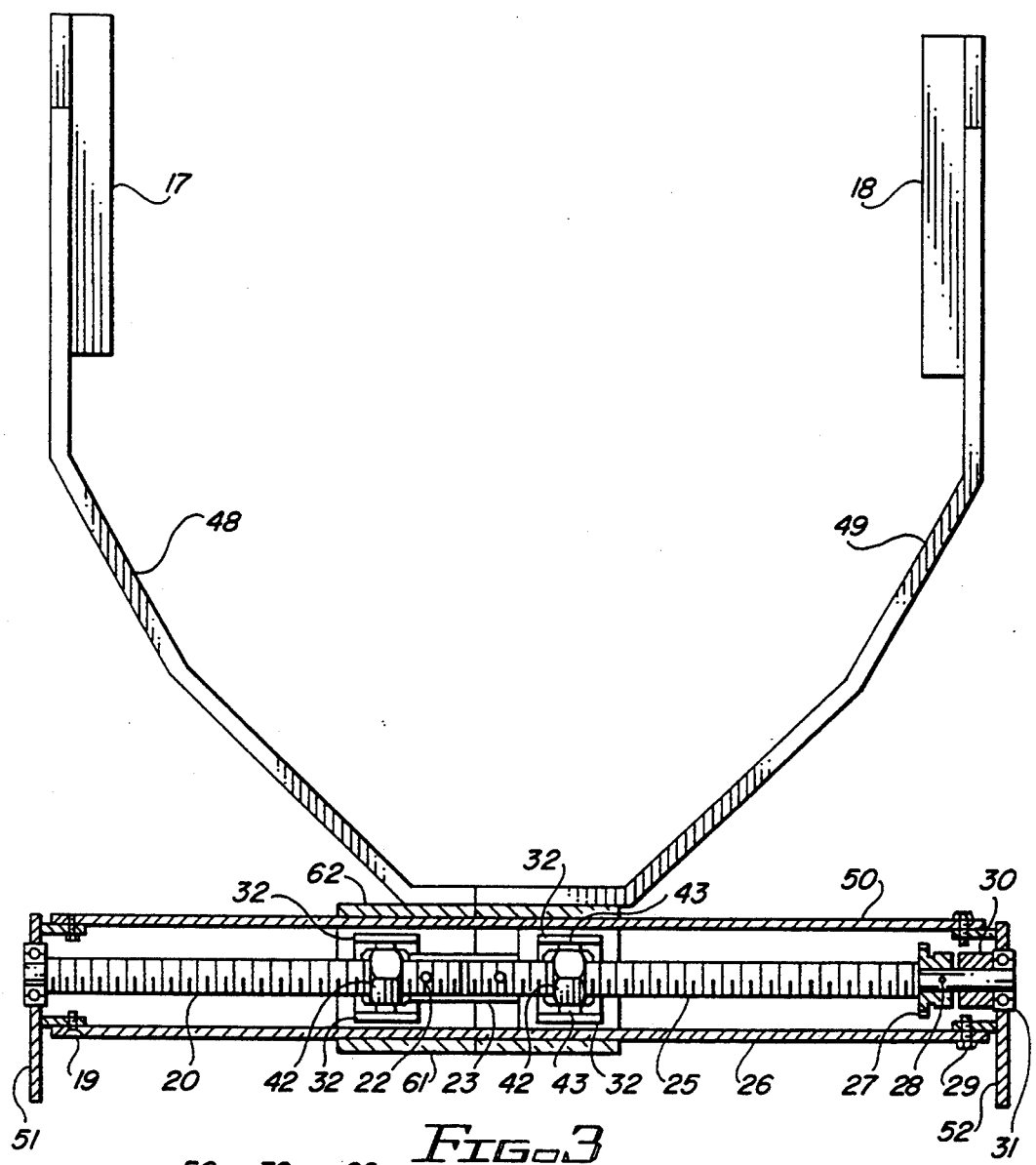
FIG. 3 is a top view of the pair of gripping extensions used to support and grasp the objects to be moved, with an exploded view of the hand truck base and means for horizontally spreading the pair of gripping extensions.

The present invention provides a hand truck which is ideally suited for transporting stacks of automotive tires. By turning crank knob 9, a rotational force is transmitted from upper sprocket 34, through link chain 14, to lower sprocket 27, which in turn rotates drive screw bars 20 and 25. Floating nuts 42 then laterally move in opposite directions along drive screws 20 and 25, and screw nut extensions 43 engage L-brackets 32 via holes 40 to laterally adjust the sleeves and the attached gripping extensions 48 and 49. Using this truck, the distance between the left and right gripping extensions can be adjusted to fit any size tire from about 20 to about 34 inches in diameter, providing about a 14 inch range. As depicted in FIG. 3, left gripping extension 48 is curved to the left and forwardly away from hand truck base 47, and right gripping extension 49 is curved to the right and forwardly away from hand truck base 47. Left gripping extension 48 is provided with flange 17, and right gripping extension 49 is provided with flange 18. Flange 17 and flange 18 provide bottom and front support for the stack of tires to be moved.

The hand truck of the present invention has been found to be substantially more stable than prior trucks in moving stacks of tires. The truck of the present invention is easier to adjust using the provided hand crank, and is capable of moving stacks of tires with minimal space required between each stack. Additionally, a truck may be constructed with the hand crank, upper sprocket and lower sprocket on either side of the frame for right handed or left handed individuals.

The "floating nut" assembly provided in the present invention is important in providing smooth lateral movement of the sleeves (and hence the gripping extensions), and also provides a means by which a greater amount of force can be transmitted to the bottom tire of a stack of tires from the hand crank. Additionally, the sleeve and gripping extension combination provides a means for preventing further lateral movement of the gripping extensions after a stack of tires is lifted, due to the weight force of the stack on the gripping extensions which transmits a rotational force on the sleeves to keep them in place.

The invention has been described in detail with particular reference to a preferred embodiment thereof, but it will be understood that the invention is capable of other and different embodiments. As is readily apparent to those skilled in the art, variations and modifications can be affected within the spirit and scope of the invention. Accordingly, the foregoing disclosure, description and figures are for illustrative purposes only, and do not in any way limit the invention which is defined by the following claims.

I claim:

1. A tiltable hand truck capable of moving an object or stack of objects across a floor, comprised of:
   (a) an upright frame containing a top portion farthest away from the floor and a bottom portion closest to the floor, said frame comprised of
      a left and a right side bar containing a top portion farthest away from the floor and a bottom portion closest to the floor, each of said side bars having a front and a rear portion connected at the top by a continuous loop,
      at least one cross bar connecting said side bars, attached to the rear portion of said side bars,
      at least one stack balancing support attached to the front portions of said side bars, extending between and attached to said side bars, and
      a base plate attached to the bottom of each of said side bars, said base plate capable of accepting an axle for wheel attachment and capable of attachment to a hand truck base;
   (b) at least two wheels attached to the bottom of said frame;
   (c) said hand truck base attached to said frame, said hand truck base comprised of a housing comprised of a front, a top and a rear portion, and a left end and a right end;

(d) a pair of gripping extensions extending outwardly from said hand truck base;

(e) a means for connecting said gripping extensions to said base so as to permit lateral movement of said extensions along said base, said means comprised of a pair of sleeves, each with a front, a top, a rear and a bottom portion, said sleeves capable of fitting over and laterally moving along said hand truck base, and said sleeves having said gripping extensions attached to said front portions thereof, said gripping extensions extending outwardly from said hand truck base, and a pair of L-shaped brackets attached to said bottom portions of each of said sleeves, said L-shaped brackets extending upwardly into said sleeves and upwardly into said hand truck base housing when said sleeves are placed over said housing;

(f) a means for horizontally spreading said gripping extensions without rotating said gripping extensions about a pivot point; and (g) a means for connecting said L-shaped brackets to said means for horizontally spreading said gripping extensions.

2. The hand truck of claim 1, wherein said means for horizontally spreading said gripping extensions is comprised of:

(a) a threaded screw bar of a sufficient length to extend and be rotatably connected to the left end and the right end of said hand truck base housing, said screw bar having a left threaded left half and a right threaded right half, each half joined by a central coupler; and (b) a screw nut threaded on said left threaded half and a screw nut threaded on said right threaded half, each of said screw nuts comprised of an interior threaded portion and an exterior gripping portion, and each of said screw nuts containing at least two screw nut extensions extending outwardly from opposite sides of said screw nuts' exterior gripping portion;

(c) a means for connecting said screw nut extensions to said L-shaped brackets extending upwardly into said hand truck base housing; and (d) a means for axially rotating said threaded screw bar so as to cause said screw nuts to move away from or towards said central coupler, and thereby cause the lateral movement of said sleeves and gripping extensions over said hand truck base housing.

3. The hand truck of claim 2, wherein said means for axially rotating said threaded screw bar is comprised of:

(a) a first sprocket located on one end of said threaded screw bar;

(b) a second sprocket located at a distance above said first sprocket, said second sprocket rotatably attached to one side of said frame;

(c) a crank knob extending outwardly from said frame and connected to said second sprocket;

(d) a chain engaged with said first sprocket and said second sprocket, so as to provide a rotational force to said first sprocket upon turning of said crank knob and to transmit said rotational force to said second sprocket.

4. The hand truck of claim 2, wherein said means for connecting said screw nut extensions to said L-shaped brackets is comprised of:

a hole in each of said L-shaped brackets, through the portion of said L-shaped brackets that extends upwardly into said housing, said holes capable of receiving said screw nut extensions.

5. A tiltable hand truck capable of moving an object or stack of objects across a floor, comprised of:

(a) an upright frame containing a top portion farthest away from the floor and a bottom portion closest to the floor; said frame comprised of a left and a right side bar containing a top portion farthest away from the floor and a bottom portion closest to the floor, each of said side bars having a front and a rear portion connected at the top by a continuous loop, at least one cross bar connecting said side bars attached to the rear portion of said side bars, at least one stack balancing support attached to the front portions of said side bars, extending between and attached to said side bars; and a base plate attached to the bottom of each of said side bars, said base plate capable of accepting an axle for wheel attachment and capable of attachment to a hand truck base;

(b) at least two wheels attached to the bottom of said frame;

(c) said hand truck base attached to said frame, said hand truck base comprised of a housing comprised of a front, a top and a rear portion, and a left end and a right end, and extending between said side bars;

(d) a pair of gripping extensions extending outwardly from said hand truck base;

(e) a means for connecting said gripping extensions to said base so as to permit lateral movement of said extensions along said base, said means for connecting comprised of:

a pair of sleeves, each with a front, a top, a rear and a bottom portion, said sleeves capable of fitting over and laterally moving along said hand truck base, and said sleeves having said gripping extensions attached to said front portions thereof, said gripping extensions extending outwardly from said hand truck base; and a pair of L-shaped brackets attached to said bottom portions of each of said sleeves, said L-shaped brackets extending upwardly into said sleeves and upwardly into said hand truck base housing when said sleeves are placed over said housing; and (f) a means for horizontally spreading said gripping extensions without rotating said gripping extensions about a pivot point, said means for adjusting comprised of:

a threaded screw bar of a sufficient length to extend and be rotatably connected to the left end and the right end of said hand truck base housing, said screw bar having a left threaded left half and a right threaded right half, each half joined by a central coupler;

a screw nut threaded on said left threaded half and a screw nut threaded on said right threaded half, each of said screw nuts comprised of an interior threaded portion and an exterior gripping portion, and each of said screw nuts containing at least two screw nut extensions extending outwardly from opposite sides of said screw nuts' exterior gripping portion;

a means for connecting said screw nut extensions to said L-shaped brackets extending upwardly into said hand truck base housing; and a means for axially rotating said threaded screw bar so as to cause said screw nuts to move away from or towards said central coupler, and thereby cause the lateral movement of said sleeves and gripping extensions over said hand truck base housing; and (g) a means for connecting said L-shaped brackets to said means for horizontally spreading said gripping extensions.

6. The hand truck of claim 5, wherein said means for axially rotating said threaded screw bar is comprised of:

(a) a first sprocket located on one end of said threaded screw bar;

(b) a second sprocket located at a distance above said first sprocket, said second sprocket rotatably attached to one side of said frame;

(c) a crank knob extending outwardly from said frame and connected to said second sprocket;

(d) a chain engaged with said first sprocket and said second sprocket, so as to provide a rotational force to said first sprocket upon turning of said crank knob and to transmit said rotational force to said second sprocket.

7. The hand truck of claim 5, wherein said means for connecting said screw nut extensions to said L-shaped brackets is comprised of:

a hole in each of said L-shaped brackets, through the portion of said L-shaped brackets that extends upwardly into said housing, said holes having a diameter slightly larger than the diameter of said screw nut extensions and said holes capable of receiving said crew nut extensions.

8. The hand truck of claim 5, wherein said object or stack of objects is comprised of an automotive tire or automotive tires.

* * * * *